Patented Apr. 8, 1941

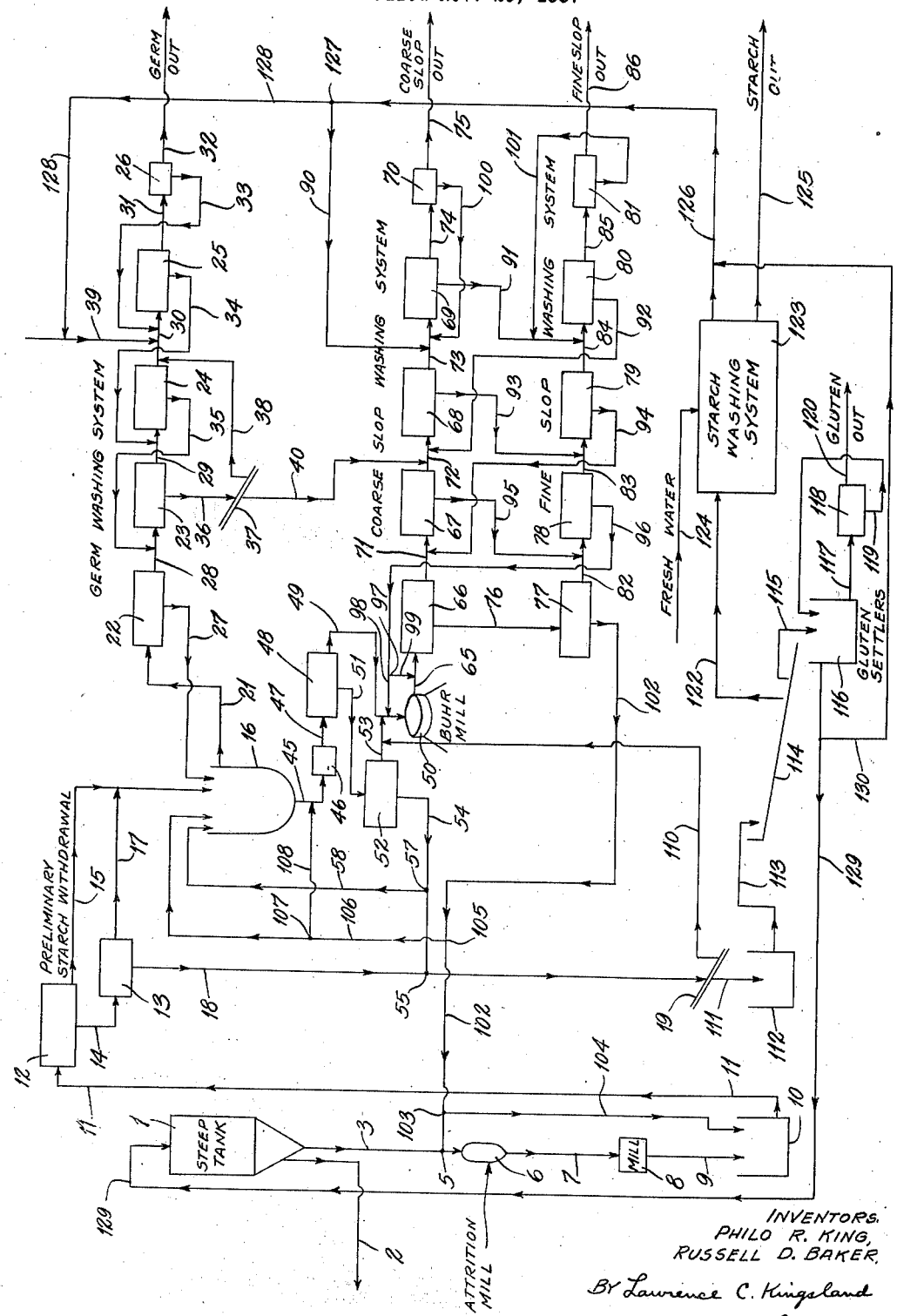

2,237,561

UNITED STATES PATENT OFFICE 2,237,561

SYSTEM FOR MAKING STARCH AND STARCH PRODUCTS

Philo R. King, Webster Groves, Mo., and Russell D. Baker, Alton, Ill., assignors to Union Starch and Refining Company, Columbus, Ind., a corporation of Indiana Application November 29, 1937, Serial No. 177,030

13 Claims. (Cl. 127—68)

The present invention relates to a system for making starch and starch products. It has particularly to do with the conservation of water and a more desirable flow of water throughout a wet corn milling system whereby certain disadvantages heretofore existing are eliminated.

In the present system a limited quantity of fresh water is introduced into the system at the starch washing operation and from there flows to the germ, coarse slop and fine slop reels, or sieves, for washing purposes therein. The addition of overflow water from the gluten settlers into these reels is at least substantially eliminated and the gluten settler overflow water is employed in its major portion for steeping of the corn where its soluble protein content will not be disadvantageous.

In the present invention the quantity of water employed is reduced by certain preliminary withdrawals of starch and gluten at relatively high specific gravity so that the remaining starch required to be washed from the hull is very materially reduced in quantity; and additionally the amount of water necessary for washing the hull is correspondingly lessened.

It is an object of the invention to provide a novel wet corn milling system wherein the quantity of water employed is very materially reduced.

It is a further object of the invention to withdraw, at strategically located preliminary points, certain quantities of starch and gluten of relatively high specific gravity thus requiring a reduced quantity of water in subsequent stages of the process.

Specifically, it is an object of the invention to withdraw from the system a quantity of starch and gluten prior to the germ separator stage, thereby permitting the withdrawal of such starch at a higher specific gravity than that normally required by the germ separator, and consequently eliminating the necessity of reducing this starch to separator gravity by the addition of water or light starch water as is customary today.

It is a further object of the invention to reduce the quantity of "free starch" of heavy gravity going to the germ separator that would otherwise have to be diluted, and thereby to enable use of starch milk therein for regulation of volume and gravity having a heavier gravity than the light starch water which is customarily introduced today.

It is a further object of the invention to reduce the grits to a fine state such that the starch and gluten of which they are composed will go into a condition of suspension, whereby such starch and gluten may be withdrawn prior to the Buhr mill and slop washing operations.

It is a further object of the invention to provide a particularly desirable and novel series crossflow system of the wash water in the germ, coarse slop and fine slop washing operations, having as its object a great reduction in the total amount of water required in said operations.

It is a further object of the invention to withdraw light starch water from the germ washing reels for use in the slop washing systems of the process.

It is an object to provide means to prevent undesirable withdrawal of the germs but to permit such withdrawal of light starch water from the germ washing reels.

It is a further object of the invention to provide a system that eliminates at least the major portion of gluten settler water ordinarily added in the germ, coarse slop and fine slop washing operations.

Further objects of the invention are to provide novel combinations of mechanisms for operation of such system and to provide novel methods based upon said system.

The drawing represents diagrammatically the present system of separating starch from the balance of the corn kernels.

In the drawing, a steep tank is shown at 1. This steep tank is adapted to receive shelled corn and a certain quantity of water, preferably mixed with some $SO_2$. The steep tank has a line 2 through which the water and its contained soluble products, taken up from the corn during the steeping, may be withdrawn and evaporated after steeping. A line 3 leads from the steep tank through junction 5 to an attrition mill 6. By means of the line 3, the steeped corn is transmitted, after the steep water is drained therefrom through the line 2, to the attrition mill.

The attrition mill shreds the grains of corn fairly coarsely so that the hull is broken, the germ is liberated or freed from the kernel, and the starch and gluten, known in this industry as "free starch," are partially freed from the other parts of the grain. This mass passes from the attrition mill through a line 7 to a mill 8 which may be inserted, if and when desired, to crush slightly the disintegrated corn kernel, liberating and freeing more starch and gluten from the larger unbroken particles of the corn kernel for purposes that will appear.

From the mill 8 the mass flows through a line 9 to a receiving tank 10. From this receiving tank, it is drawn through a line 11 into preliminary separating reels or screens 12 and 13. The screen 12 is normally coarse and the screen 13 is very fine.

As will be explained hereafter, starch milk from a subsequent operation is added prior to the entry of the corn into the attrition mill 6 and also into the reels 12 and 13.

A relatively heavy starch milk from the reel 12 passes through line 14 into and through the screen 13. The products, including hulls, grits, germs, etc. separated in the reels 12 and 13, pass through the lines 15 and 17 into the germ separator 16. The starch milk from the reel 13, including starch milk received through the line 14, passes through a line 18 to a screen 19 as will be described.

The germ separator, as is known in the art, operates by virtue of the fact that within a limited gravity range the germs will float whereas the hulls, grits, etc. will sink. This range of gravities is normally between 7° and 9° Baumé which, as will be shown, is maintained in the germ separator 16. Consequently, the germs may be drawn off from the top of the separator 16 through a line 21 to a series of screens or reels 22, 23, 24 and 25 and ultimately through a squeezer or moisture expeller 26. From the reel 22 the starch milk is returned by line 27 into the germ separator 16 to maintain the proper volume of liquid therein so that subsequent germs may be floated off over the top thereof. The germs screened by the reel 22 pass through a line 28 into the second reel 23, from there through a line 29 to the third reel 24, and thence through a line 30 to the final reel 25. A line 31 carries them from the final reel 25 to the squeezer 26 in which the free moisture is removed. The germs are then discharged from the system through the line 32.

The moisture or liquid removed by the squeezer 26 is transmitted by a counter-flow line 33 back into the line 30 to flow again into the reel 25 with the germs from the reel 24. Likewise, the liquid from the reel 25 is carried back by a counterflow line 34 to the line 29 leading to the reel 24; and the liquid from the reel 24 is carried by a counter-flow line 35 back to the line 28 leading into the reel 23. From the reel 23, which therefore constitutes the light starch water outlet from the germ washing system, such light starch water is drawn off through a line 36 to an intermediate screen 37. This screen separates and recovers any germs that may accidentally pass through the screen of the reel 23, and such germs are transmitted back through a line 38 to the line 30 leading into the reel 25 of the germ washing system.

Forecasting, it may be noted that additional water is introduced into the germ washing system through a line 39 leading to the line 30. Also the light starch water, leaving the germ washing system and flowing through the intermediate screen 37, is carried by a line 40 into the coarse slop and fine slop washing systems.

Returning to the germ separator 16, the mass of starch milk, grits, hulls, etc., is drawn off from the bottom thereof through a line 45 to a mill 46 in which mill the grits and hulls are subjected, in the presence of the starch milk accompanying them, to a much more thorough disintegrating and crushing operation than theretofore. This results in freeing an increased amount of starch and gluten from the hulls and, by grinding the grits, allows the starch and gluten of which they are composed to go into suspension with the starch milk already present. This creates an additional amount of "surplus" starch milk with advantages as will appear hereinafter.

From the mill 46, the mass flows through a line 47 to a coarse screen 48. From this screen the solid matter, now mostly hulls, is passed by a line 49 directly into a Buhr mill 50. The starch milk, including "surplus" previously noted, is transmitted from the screen 48 through a line 51 into a fine screen 52. Thus in these screening operations immediately prior to the Buhr mill, additional starch and gluten are removed from the system prior to the final grinding and washing operations and consequently less water is necessary in said washing operations. From the screen 52 the finer particles of hull are carried through a line 53 into the line 49 and to the Buhr mill 50. The starch milk is carried from the screen 52 through a line 54 to a junction 55, in the line 18 leading from the screen 13 whence it passes to the screen 19. An additional part may be directed from a junction 57 via line 58 into the separator 16.

From the Buhr mill the mass, which is primarily ground hull, flows through a line 65 to the coarse and fine slop washing systems. The coarse slop system includes reels or screens 66, 67, 68, and 69 with a final squeezer 70. The line 65 from the Buhr mill leads into the first reel 66. From this reel the hulls that are so coarse as not to pass through this copper screen are carried through a line 71 to the reel 67. A line 72 transmits them from the reel 67 to the reel 68; a line 73 transmits them from the reel 68 to the reel 69; and a line 74 transmits them from the reel 69 to the squeezer 70. From the latter they are carried through a line 75 out of the system.

The fine slop and starch milk that pass the screen of the reel 66 go through a line 76 into the fine slop washing system. This system includes a series of silk reels or screens 77, 78, 79, and 80 followed by a press 81. The fine hulls from the screen 77 flow through a line 82 to the screen 78; from there through a line 83 to the screen 79; from there through a line 84 to the screen 80; and thence through a line 85 to the press 81 from which they are withdrawn from the system through a line 86.

The coarse and fine slop washing systems have a unique cross counter-flow arrangement for the passage of the water in series through their several screens. From a source to be described hereafter, a water supply line 90 leads into the line 73 to direct water into the last screen 69 of the coarse slop washing system. A line 91 leads from this screen 69 to the line 84 ahead of the last screen 80 of the fine slop washing system. From this screen 80 there extends a counter-flow line 92 to convey the water back to the line 72 leading into the next-to-last screen 68 of the coarse slop washing system. This screen 68 has leading therefrom a line 93 connecting into the penultimate screen 79 of the fine slop washing system. A counter-flow line 94 leads from the screen 79 to the line 71 leading into the screen 67 of the coarse slop washing system. A line 95 leads from this screen 67 into the line 82 leading into the screen 78 of the fine slop washing system. A counter-flow line 96 passes from the screen 78 to a junction 97, wherefrom it branches into the line 98 passing into the line 49 and the Buhr mill, and a line 99 passing into the line 65 leading into the first screen 66 of the coarse slop washing system.

A counter-flow line 100 leads from the squeezer 70 to convey water removed by it from the coarse slop back into the line 73 ahead of the screen 69. Likewise a counter-flow line 101 leads from the press 81 back into the line 91 ahead of the last screen 80 of the fine slop washing system.

Without going into the details of the operations, it is already obvious from the foregoing that the water introduced at 90 flows backward in series through both slop washing systems, counter to the flow of the slops, and finally, having taken up certain quantities of starch from the slops to become what is termed in the art a "light starch water" or starch milk of low specific gravity, is withdrawn from the coarse and fine slop systems through a line 102 from the fine slop screen 77. This line leads to the junction 5 to carry a portion of this liquid into the attrition mill. Another portion is withdrawn at a junction 103 by a line 104 into the supply tank 10. A further, and usually major, proportion is withdrawn from a junction 105 through a line 106 into the germ separator 16, or from a junction 107 in the line 106 via a line 108 into the starch line 45 off the bottom of the germ separator 16.

It will be apparent from the foregoing that all of the heavy starch milk ultimately is brought to the screen 19, either through the line 18 from the screen 13, or through the line 54 from the screen 52. In the screen 19 any particles of hulls and the like are separated and pass back through a line 110 to the line 53 leading into the Buhr mill 50. The heavy starch milk from the screen 19 flows through a line 111 into a tank 112 from which it is directed through a line 113 and discharged on to the starch tables 114. The starch tables comprise long flat surfaces having a very slight grade and over which the starch milk is flowed. The starch settles out and the gluten and water flows from the starch tables through a line 115 into the gluten settlers 116.

The gluten is withdrawn from the settlers 116 through a line 117 to gluten presses 118. These presses remove the water from the gluten, which water may be returned by a line 119 into the settlers 116 for resettling. The gluten is then conveyed out by a line 120.

The starch from the tables 114 is directed through a line 122 into the starch washing system 123. Fresh water is introduced through a line 124 for washing of the starch. The system includes a filter for removal of starch from the wash water. From this starch washing system 123 the clean starch is then carried off through a line 125 and out of the system. The water from the starch washing system, after being filtered, is passed through a line 126 to a junction 127. From this junction leads the line 90 into the slop washing systems, and the branch 128 that leads to the line 39 introducing water into the germ washing system. It is immediately apparent that the water introduced through the line 126, having been filtered, is free of starch.

From the gluten settler 116, the water is decanted off through a line 129 back into the steep tank 1 where it is employed, as has been noted, for steeping the new corn. A portion of this gluten settler water, if desired, may be directed through a line 130 into the line 126 and back into the system.

The operation of the system is as follows:

It will be assumed that a quantity of corn is within the steep tank 1 and that this corn is steeped with gluten settler water from a previous run. When the steeping is finished, the corn grains have become softened and are drawn out through the line 3 toward the attrition mill 6. Some starch milk is added here from the line 102, as will be explained hereafter, to facilitate the mill operation. In the attrition mill 6, the corn is broken or disintegrated sufficiently to free the germ. Where the mill 8 is provided, subsequent to the attrition mill 6, a further disintegration or crushing of the kernels is effected for the purpose of breaking at least some of the grits and thereby freeing more starch and gluten to go into suspension with the starch milk present or to be introduced into receiving tank 10, following which the mass is conveyed to the tank 10.

The disintegrated corn, together with the starch milk introduced through lines 102 and 104, is conveyed from the receiving tank 10 to the screens 12 and 13. Practically all the starch and gluten set free from the corn kernels by the milling operation or operations at 6 and 8 and taken into suspension by the starch milk introduced before and after these milling operations, passes with said starch milk through screens 12 and 13 and is withdrawn from the system via the line 18, screen 19, line 111, receiving tank 112, and line 113 to the starch tables 114. The resultant gravity of the starch milk from screen 13 will be from 10° to 13° Baumé. Thus, a large percentage of the starch and gluten contained in the corn is removed before the balance of the kernel is introduced into the germ separator, thus eliminating the necessity of reducing all this starch and gluten so removed to the customary separator gravity of from 7° to 9° Baumé by the introduction of water or light starch water for the purpose, which is customary in processes heretofore practiced, and in which old processes, as a source of supply of light starch water for this purpose, an excess of water or gluten settler water is used in the germ washing system, which eventually finds its way back to the germ separator.

From the two screens 12 and 13, the heavy material, consisting of germs, hulls and grits, is conveyed through lines 15 and 17 to the germ separator tank 16. In this separator, the level of the starch milk must be maintained sufficiently high and the amount directed into it of sufficient volume so that there will be a continuous and sufficient flow over the bridge wall automatically to carry off the floating germs; and, as previously noted, the specific gravity must be maintained at a range to float the germs, but not to float the hulls or grits, this range being normally from 7° to 9° Baumé. This volume and this gravity are maintained in a manner to be described.

The germs are conveyed off through the line 21 to the germ draining and washing screens 22 to 25 inclusive. The starch milk from the first screen 22 has the same gravity as that in the separator 16. Consequently, the starch milk from this screen 22 is advantageously conveyed back through line 27 to the separator 16 to aid in maintaining the volume therein, which it does without change in gravity. The germs from the screen 22 are then successively conveyed to the screens 23, 24, and 25 of the germ washing system, the squeezer 36, and out of the system.

Wash water is supplied through the lines 126, 128 and 39 from the starch washing system, in amount, for example, of approximately 7 to 8 gallons per bushel of corn. This wash water and water from the squeezer 26 directed back through the line 33 are introduced into the line 30 and enter with the germs into the final screen 25 of the germ washing system and wash them. The wash water from the screen 25 is directed back through the line 34 to the line 29 and passes with the germs in that line into the screen 24 and washes the germs in this screen. The wash water from the screen 24 is directed back through the line 35 to the line 28 and passes with the germs in that line into the screen 23 to wash the germs therein. It will be observed that the cleanest water is applied to the cleanest germs, and that as it becomes successively dirtier (i. e. more abundant in starch) it is washing successively dirtier germs.

In this invention, the wash water from the screen 23 is directed via the line 36, sieve 37 and line 40 into the line 72 of the coarse slop washing system to be again or further used in that and the fine slop washing system. Screen 37 is introduced as a precautionary measure to catch any germs that may inadvertently leave the screen 23 with the wash water. They are returned via lines 38 and 39 to screen 25. This last course of the wash water from the screen 23 is to be contrasted with former systems, wherein the wash water from screen 23 is returned to the attrition mill 6 or the receiving tank 10 to dilute the mass of disintegrated corn and starch milk going to germ separator, and to maintain the proper gravity therein.

The germs from the germ washing system are ultimately conveyed out through the line 32.

Returning to the germ separator 16, with its specific gravity properly maintained, the grits and hulls sink to the bottom and, with a certain amount of starch milk, leave the separator through the line 45, going to the mill 46. It will be further noted that additional starch milk of lighter gravity is introduced into the mill 46 through the line 108. In the mill 46, the grits primarily are further ground or crushed so that practically all of the starch and gluten of which the grits are composed go into suspension with the starch milk present. The outflow from the mill 46 is conveyed through the line 47 to the coarse screen 48 and thence through the line 51 to the fine screen 52. It is evident that the starch milk leaving the bottom of the germ separator at 9° to 11° Baumé, by taking into suspension the starch and gluten of the grits in the mill 46 as explained, will issue therefrom at a much higher gravity. This gravity may be from 12° to 14° Baumé. From the screen 52, the starch milk may be directed through the line 54, junction 55, and line 18 to the screen 19, thence via the line 111, receiving tank 112 and line 113 to starch tables 114. Other portions may be diverted via the junction 57 and line 58 to the separator 16 to aid in maintaining the proper gravity there, in case such gravity is too low. From the screens 48 and 52, the hulls and fine unground grits, if any, are discharged through the lines 49 and 53 to the Buhr mill 50.

From the Buhr mill 50, the ground hulls or slop pass through the line 65 into the first screen 66 of the coarse slop washing system. This screen is of comparatively coarse mesh, allowing the finer particles of hull (fine slop) to pass through with the starch milk into the screen 77, the first screen of the fine slop washing system. The coarse slop continues through the screens 67, 68 and 69 and the fine slop continues through the screens 78, 79 and 80.

A suitable quantity of water (for example, approximately 5 or 6 gallons per bushel of corn) is introduced through the line 90 into the line 73 of the coarse slop washing system whence it enters with the coarse slop into the final screen 69 of that system. The light starch water removed from the coarse slop in the squeezer 70 is also returned through the line 100 into the line 73 and thence with the coarse slop also enters the final screen 69 of that system. This water washes the slop on the screen 69, and takes up starch therefrom. It then flows from the screen 69 through the line 91 into the line 84 and thence, with the fine slop, into the final screen 80 of that system. There is also directed back through the line 101 into the line 91 and the screen 80 the water from the fine slop filter press 81. This water washes the fine slop in the screen 80, and takes up the starch therefrom.

The light starch water from the screen 80 is directed back through the line 92 to the line 72 entering with the coarse slop into the next to last screen 68 of that system. From the screen 68 through the line 93, it continues into the line 83 and thence, with the fine slop, into the next to last screen 79 of that system. From there, it continues successively, and in like manner, to the second screen 67 of the coarse slop system, the second screen 78 of the fine slop system, the first screen 66 of the coarse slop system, a small amount being diverted to the Buhr mill 50 to facilitate its operation, and finally to the first screen 77 of the fine slop system. Thus, the wash water travels not only counter-current to the material in both systems, but in series relative to the two systems rather than in tandem which has been the customary method heretofore. It washes all of the products in the several screens, the cleanest of both systems being washed first, and successively dirtier products being washed with successively dirtier water.

It will be observed further that wash water from the germ washing system is directed through the screen 37 and the line 40 into the line 72 of the coarse slop washing system to augment the amount of water directed into this system through the line 90 and, of course, follows the series counter-current flow described above. This water is introduced into the coarse (or fine if desired) slop washing system at a point wherein the gravities of the mixing waters will be approximately the same.

Ultimately, from the slop washing systems, the coarse slop is conveyed away by the line 75. Likewise, the fine slop is conveyed away through the line 86.

The counter-current crossflow series principle herein described has particular application to the present system, in cooperation with the reduction and elimination from the system of starch by prior steps in the milling operations. Separately, it may be applied to other starch making and similar systems, so that it is made the subject of a separate application for Letters Patent, Serial Number 177,031, filed November 29, 1937.

As noted, the final starch milk obtained from the slop washing systems is of approximately 3° to 6° Baumé gravity. Its gravity is determined by the volume of water added through the line 90, and that from the germ washing system through the line 40, the volume from the latter being the same as that entering the germ washing system through the lines 128 and 39.

The amount of heavy starch milk going to the germ separator having been greatly reduced by the introduction of sieves 12 and 13, the large amount of light starch water formerly introduced into the germ separator (generally from the germ washing system and now directed into these coarse and fine slop washing systems) for the purpose of maintaining the proper gravity therein, is correspondingly reduced, the smaller amount required for the purpose being now supplied from the line 102 and having a gravity of 3° to 6° Baumé. The volume of starch milk in or going to the germ separator to maintain the correct amount of overflow and bottom outflow therefrom is maintained by returning the starch milk from the germ sieve 22 (having the same gravity as the germ separator) and supplementing this by correct amounts and in proper portions of starch milk from the line 54, junction 57 and line 58 having a gravity of from 12° to 14° Baumé, and from the line 102, junction 105 and line 106, this starch milk having a gravity of from 3° to 6° Baumé.

It is entirely clear, therefore, that the large amount of starch water of low gravity, such as has formerly been used and generally obtained from the germ washing system at approximately 1° Baumé, is not required to be added to the germ separator either to produce volume or to reduce gravity. Water from the germ washing system (line 40) may therefore be used to augment the fresh water introduced in the course and fine slop washing systems through the line 90, and thereby to reduce the amount of other water required by these systems.

The remaining water from the line 102 off the slop washing systems is either conveyed to the line 3, at the junction 5, to assist there in lubricating the mill 6, or is diverted off at the junction 103, through the line 104, into the tank 10. Thus, this remaining starch milk from the slop washing systems, through the line 102, ultimately passes from the tank 10 through the line 11 and through the screens 12 and 13, via the line 18 to the screen 19 and finally to the starch tables. The starch milk in the line 18 has already been said to be very heavy or approximately 13° Baumé.

Thus the starch and gluten have been taken from the system in two places, and from the screen 19, pass through the line 111 to the tank 112. From this tank, through the line 113, the mixture goes to the starch tables 114 from which, in the manner known in the art, the starch is directed to the starch washing system 123.

It is in the starch washing system that the entire supply of fresh water for the entire milling system is added. This amounts, for example, to from 12 to 14 gallons per bushel. This fresh water, having first been filtered to remove any starch inadvertently contained therein, resulting from its having been used to remove solubles from the starch, passes through the line 126. The line 126 extends to the junction 127, where the supply of this water is properly divided between the line 90, leading to the slop washing systems, and the line 128 leading to the inlet line 39 to the germ washing systems. By virtue of the reduced quantities of water necessary in the slop washing stages, as explained, this 11 to 14 gallons of water per bushel of corn is at least substantially all that is required for these washing operations. Only at most a small amount of gluten settler water is recirculated in the present system.

The gluten that settles in the gluten settlers 116 is withdrawn through the line 117 to the gluten press 118, in which water is removed and returned by the line 119 to the tanks 116 for resettling. The gluten thus filter pressed is removed through the line 120.

The water from the gluten settlers contains valuable proteins, and is directed through the line 129 to the steep tank 1, and any necessary small portion is taken from the line 129 by line 130 back into the system. After the steeping operations, the water from the steeps is withdrawn through the line 2 and processed for recovery of the proteins.

From the foregoing it may be seen that a wet corn milling system for the recovery of starch and other corn products is devised in which, by the removal of a preliminary quantity of starch and gluten and the reduction of the amount of starch and gluten entering the germ separator, and by a further separation of starch and gluten from the hulls prior to the final grinding and washing operations of same, and by a novel method of washing the germs and hulls, the total amount of water required in the system is materially reduced and the necessity of reusing the gluten settler water is to at least a major extent, eliminated.

What is claimed is:

1. In a method of making starch and allied products, the steps of separating the germs from a mass in a germ separator, flowing the remainder of the mass from the separator, disintegrating the remainder in the presence of starch milk to put the starch and gluten disintegrated into suspension with the starch milk, removing this starch milk, directing the remainder into a mill for grinding into coarse and fine slops, and finally washing said slops.

2. In a method of making starch and grain products, the steps of separating out the germs, grinding the remaining mass in the presence of sufficient starch milk to break up the starch grits and the like to put the ground grits into suspension as starch milk, passing the mass obtained into screens to separate the starch milk from the remainder, returning a portion of the starch milk to the germ separator to alter the gravity therein, withdrawing another portion thereof, and grinding the remainder as slops and washing the same.

3. In a method of making starch and grain products, the steps of separating out the germs in a flotation germ separator, grinding and screening the total mass from the bottom of said separator and separating a starch milk therefrom of high gravity relative to that of the separator, grinding the mass from said screening operation into slops, washing said slops by the addition of water obtaining a starch milk of low gravity relative to that in the separator, and directing heavy starch milk from said screens and light starch milk from said slop washing into the germ separator to control the volume and gravity therein.

4. In a method of making starch and grain products, the steps of disintegrating the grain in the presence of a suspending medium that takes up the finely disintegrated starch and gluten to form a heavy starch milk, screening the mass in preliminary screens to remove at high gravity a substantial portion of the starch milk, directing the remainder of the mass into a germ separator operable by flotation, removing the germs in said separator, grinding and screening the remainder of the entire mass from the bottom of the germ separator in intermediate mill and screens in a liquid suspension to remove additional starch milk, grinding the remainder of the mass from the intermediate screens to make slops thereof, washing said slops and obtaining light starch milk from the washing, adding part of the light starch milk therefrom to the mass entering the preliminary screens to take into suspension starch therein to enable the same to be withdrawn from the system, and employing another part of the light starch milk from said slop washing for use in controlling the gravity and volume in the germ separator.

5. In a method of making starch and grain products, the steps of disintegrating the grain to liberate the germs therein in the presence of starch milk, directing additional starch milk to the mass to cause a substantial portion of the starch and gluten freed from the kernel in the disintegrating operation to go into suspension, directing the mass through screens through which the starch milk passes and is removed, directing the remaining mass to a germ separator to remove the germs by flotation, screening the germs thus separated and directing the starch milk therefrom back to the separator to add volume thereto; withdrawing the remaining mass from the separator, grinding the contained grits therein whereby they go into suspension as starch milk, screening the same in intermediate screens to separate the said starch milk, grinding the mass from the intermediate screens to make slops, washing said slops, directing part of the heavy starch milk from the intermediate screens to the germ separator, removing the balance from the system, and directing the starch milk from the slop washing systems to the germ separator, the first disintegrating mill, and to the preliminary screens.

6. In a method of making starch and grain products, the steps of disintegrating the grain to liberate the germs therein, and providing water to take into suspension starch freed by the disintegration, withdrawing a substantial portion of the starch therefrom in preliminary screens, separating the germs in a flotation separator, directing the germs to a germ washing system, grinding and screening the hulls and grits obtained from the separator, producing slops, washing the slops, adding fresh water to the starch obtained from the system to wash the same, conveying the water from the starch washing to the germ washing and slop washing systems for operating the same, and directing the water from the germ washing system into the slop washing system to assist in the latter system.

7. In a method of making starch and grain products, the steps of disintegrating the grain to liberate the germs therein, supplying water to take into suspension starch freed in the disintegration withdrawing a substantial portion of the starch therefrom as starch milk in preliminary screens, separating the germs in a flotation separator, directing the germs to a germ washing system, grinding the remaining mass obtained from the germ separator in an intermediate mill in the presence of starch milk to cause additional starch and gluten to go into suspension as starch milk, screening the same, directing this starch milk back into the system ahead of the last-named screening, in part, and withdrawing the balance, grinding the remaining mass from the intermediate mill and screens into slops, washing the slops, separating the starch from the withdrawn starch milk, washing such starch with fresh water, directing the water from the starch washing system to the germ washing system and to the slop washing system, directing the water from one of the latter two systems to the other to augment the washing in the same, and returning water from the washing systems to the germ separator to aid in regulating the gravity and volume therein.

8. In a method of making starch and grain products, the steps of steeping the grain, disintegrating it to liberate the germs therein, screening the mass in preliminary screens and withdrawing a substantial portion of the starch and gluten therefrom, separating the germ from the mass obtained from the preliminary screens in a flotation separator, directing the germs to a germ washing system, grinding in an intermediate mill the total mass obtained from the bottom of the separator to cause additional starch and gluten to go into suspension, withdrawing the suspension through intermediate screens, directing a portion of it back into the germ separator, and withdrawing the balance to starch tables, grinding the mass from the intermediate screens to make coarse and fine slops, separating the slops, directing the separated slops to coarse and fine slop washing systems, washing the separated starch from the starch tables, directing the water from the starch washing to the germ washing system and to one of the slop washing systems, passing the water from the germ washing system into a screen, returning the mass from the screen back to the germ washing system, directing the water from this screen into one of the slop washing systems, directing the water in said slop washing system to flow back through both slop washing systems, then directing it in part ahead of the preliminary screens, and in part into the germ separator, and directing the water from the gluten settlers back from steeping the grain.

9. A method as in claim 8, including the step of regrinding the mass prior to the preliminary screens and further liberating and breaking up a substantial portion of the grits obtained from the first mill.

10. In a method of making starch and grain products in a system having a preliminary withdrawal of starch, a germ separator, and slop washing systems, the steps of treating the grain to liberate starch therefrom, and putting said liberated starch into suspension, thereafter removing at least a part of said suspension as starch milk from said series, passing the remainder into the separator, flowing the germs away in the separator leaving a balance, removing said balance, crushing the same in liquid to create additional heavy starch milk, withdrawing said additional heavy starch milk, passing the slops into washing system and flowing washing liquid over them, and maintaining the gravity of the separator by the introduction therein of said remainder, some of said additional heavy starch milk and said washing water from the slop washing systems.

11. In a closed system of making starch and allied products, including the steps of separating out germs from grain in a gravity separator, washing starch from the germs and hulls, employing the washing medium obtained therefrom to provide an adequately low gravity in the separator, and reducing the amount of water required for the washing and for the separator by the steps of withdrawing heavy starch milk prior to the separator, and of disintegrating grits and withdrawing them as heavy starch milk prior to the hull washing.

12. In a method of deriving starch and related products from grain in a wet milling system including a gravity separator and washing systems, and of reducing the amount of water required therein, the steps of supplying a small amount of starch milk to the grain and disintegrating the grain in the presence thereof to liberate the germs and to free at least a substantial part of the starch and gluten from the grain, supplying additional starch milk, to cause the freed starch and gluten from the disintegrated grain to go into suspension in the supplied starch milk, withdrawing at least a substantial part of said starch and gluten in suspension from the said milling system prior to gravity separation of the germs to reduce the mass of material requiring dilution in the separator, leaving a remainder including germs, thereafter conducting the remainder to the gravity separator, and supplying to it only enough starch milk to dilute it, exclusive of that withdrawn, to separator gravity, separating the germs from the hulls in the separator, conducting the separated germs and hulls to washing systems, supplying only enough water in the washing systems to effect washing, to effect liberation of the germs, to produce the suspension withdrawn, and to obtain the dilution specified for the separator, flowing the water through the washing systems, and thereafter diverting it to accomplish the said liberation, suspension and dilution as set forth.

13. In a method of deriving starch and related products from grain in a wet milling system including a gravity separator and washing systems, and of reducing the amount of water required therein, the steps of supplying a small amount of starch milk to the grain and disintegrating the grain in the presence thereof to liberate the germs and to free at least a substantial part of the starch and gluten from the grain, supplying additional starch milk, to cause the freed starch and gluten from the disintegrated grain to go into suspension in the starch milk supplied, withdrawing at least a substantial part of said starch and gluten in suspension from the milling system prior to gravity separation of the germs to reduce the mass of material requiring dilution in the separator, and to reduce the mass of starch-bearing material going to the washing systems, leaving a remainder including germs, thereafter conducting the remainder to the gravity separator, and supplying to it only enough starch milk to dilute it, exclusive of that withdrawn, to separator gravity, separating the germs from the hulls in the separator, conducting the separated germs and hulls to separate washing systems, supplying only water to the systems collectively to effect washing, to effect liberation of the germs, to produce the suspension withdrawn, and to obtain the dilution specified for the separator, flowing the water first into the washing systems and causing at least a part of it to counterflow in at least two systems to reduce the amount of water for washing in said systems, and thereafter diverting the water to accomplish the said liberation, suspension and dilution as set forth.

PHILO R. KING.
RUSSELL D. BAKER.